UNITED STATES PATENT OFFICE.

WILHELM SCHUMACHER, OF OSNABRÜCK, GERMANY.

MANUFACTURE OF ARTIFICIAL STONE FROM SLAG.

977,681.  Specification of Letters Patent.  Patented Dec. 6, 1910.

No Drawing. Application filed July 5, 1906. Serial No. 324,901.

*To all whom it may concern:*

Be it known that I, WILHELM SCHU-MACHER, chemist, and a subject of the King of Prussia, residing at Osnabrück, in the Kingdom of Prussia, German Empire, have invented a new and useful Improvement in the Manufacture of Artificial Stone from Slag, of which the following is a full, clear, and exact description.

The utilization of blast furnace slag is of great importance for blast furnace works. It has been used in a granulated form produced by the action of water according to the method of Lürmann, for the manufacture of building blocks, the slag being mixed with from 8 to 10 per cent. of calcium hydrate and the formed blocks left to harden gradually in the air. This manufacture is however subject to several disadvantages, and has consequently not met with extended application. In the first place, only the light slags such as are formed in the production of foundry pig iron, are suitable for the purpose, the heavier vitreous slags being inapplicable. Furthermore, the blocks so produced require to be left for a long time, generally several months, in the open air before they are sufficiently hardened to be capable of being transported and used. Thus large spaces are required for storage, which are not always available at smelting works. The blocks only acquire a perfect degree of hardness after some years, and even then their strength is not always sufficient for satisfying the highest requirements. The compression strength seldom rises above 80 kilos per square c. m. and is mostly below that. Lastly there is the disadvantage that the manufacture cannot be carried on during the winter months, as the blocks cannot stand frost during the first weeks. It would seem obvious to obviate these disadvantages by applying the method of lime-sand block manufacture to the slag block manufacture, in subjecting the blocks to the action of pressure steam in closed chambers instead of hardening them in the air. Numerous experiments have been made in this direction, but without much success; the blocks made in this manner have not sufficient strength. This is probably due to the fact that in consequence of the sudden solidification of the slag when immersed in water, tensional strains are produced in the parts thereof which cause numerous cracks in the particles. When such slag is heated in pressure steam, the said strains cause the particles to split up or to crack to a greater extent, which action is probably promoted by the particles becoming hydrated on the surface and in the cracks and being thereby increased in volume, such hydration being facilitated by the presence of hydrate of lime. Such action naturally acts detrimentally on the structure of the blocks and reduces their strength. According to the present invention, this disadvantage of the steam hardening process is obviated by subjecting the slag to a coarse disintegrating process, whereby the said tensional strains therein, which are detrimental to the steam hardening process, are done away with and whereby also the addition of lime can be reduced to a minimum or even entirely dispensed with. It is not necessary for this purpose to carry the disintegration so far as to reduce the slag to a pulverulent condition, as the expense of this would be prohibitive in view of an economical manufacture; it is sufficient to pass the slag through a disintegrator roller mill, or other coarse crushing apparatus so that only the parts of the slag that are most easily split up are acted upon so as to produce a material of a granular or grit-like nature.

When I speak in the claims of "coarsely disintegrating" granulated slag I refer to the process of grinding, crushing or otherwise disintegrating such slag until the internal tensional strains are substantially eliminated without, however, carrying the process to a point at which the slag enters upon a pulverulent condition. It will be evident that by means of this preliminary treatment the total surface of the mass and consequently its capacity for being compressed, as also its binding powers or hydration, will be increased. The expense of such a coarse disintegration is comparatively small, in particular as the process can be introduced without difficulty into the continuous manufacture as at present carried out. The granulated slag is for this purpose passed, as it comes from the blast furnace, through a disintegrator or other coarse crushing apparatus, and, if an addition of lime is not necessary or desirable (as is generally the case in particular with the light strongly basic slags) it is then directly transported by an elevator to above the presses. If a small addition of hydrate of lime is of advantage for the strength of the blocks, which addition should at most amount to two per cent. and can easily be determined for each particular slag by means of experiment, this may advantageously be added to the slag before the crushing. It can of course also be effected after the crushing by conveying the slag and hydrate of lime to the elevator by means of a mixing worm-conveyer.

If calcium oxid be added to the slag instead of hydrate, the entire mass requires to be heated in order to effect the slaking of the calcium oxid. The heating of the mass is best effected by means of steam, and this is also of advantage when calcium oxid is not used.

By the heating of the slag, its binding process is initiated and thereby its treatment by pressure is facilitated. The blocks, on leaving the press, either harden sufficiently of themselves in the air in a short time, generally requiring only a few hours, in particular when made of light strongly basic slag, and when the mass has been heated before pressing; or they are placed upon trucks and conveyed into a hardening chamber where they are subjected to steam pressure of about 8 atmospheres for about 12 hours. On leaving the chamber the blocks are at once ready for use. They possess a very considerable strength, such as that of ordinary bricks and also continue to harden in the open air. They mostly attain a compression strength of 200 kilos, frequently even three hundred kilos, per square c. m., and they are of great uniformity both as to configuration and strength.

All kinds of slags are suitable for this improved manufacture of building blocks; the hardest and heaviest slags which are not applicable for the ordinary process of manufacture even give the hardest blocks.

Instead of blast furnace slags, any other granulated slag, for example that produced in the Martin process, may of course be used.

Blocks of extraordinary strength can be obtained in particular with the light strongly basic slags if there be added thereto up to 20 per cent. of finely powdered quartz or the like. This fine silica combines during the steam hardening with the excess of lime of the slag, to firm silicate of lime. Blocks are by this means obtained which even exceed pure Portland cement in strength. Consequently all articles can be produced by the new manufacture that are produced with Portland cement.

What I claim and desire to secure by Letters Patent of the United States is:

1. The herein described method of manufacturing artificial stone, which consists in coarsely disintegrating granulated slag, heating the disintegrated mass and then subjecting it to pressure, in the presence of moisture.

2. The herein described method of manufacturing artificial stone, which consists in coarsely disintegrating granulated slag, compressing the disintegrated mass into coherent bodies and subjecting such bodies to the action of steam under pressure.

3. The herein described method of manufacturing artificial stone, which consists in coarsely disintegrating granulated slag, heating the disintegrated mass, compressing it into coherent bodies and subjecting such bodies to the action of steam under pressure.

4. The herein described method of manufacturing artificial stone, which consists in coarsely disintegrating granulated slag, then mixing it with lime and a suitable liquid, and heating the mixture and subjecting it to pressure, or subjecting such bodies to the action of steam under pressure.

5. The herein described method of manufacturing artificial stone, which consists in coarsely disintegrating granulated slag, then mixing it with lime and a suitable liquid, heating the mixture, compressing it into coherent bodies and subjecting such bodies to the action of steam under pressure.

In witness whereof, I have hereunto signed my name in the presence of two subscribing witnesses.

WILHELM SCHUMACHER.

Witnesses:
F. REICH,
C. DIEDERICH.